United States Patent
Shaik et al.

(10) Patent No.: US 8,065,408 B2
(45) Date of Patent: Nov. 22, 2011

(54) METHOD AND SYSTEM FOR DYNAMIC DEVICE ADDRESS MANAGEMENT

(75) Inventors: Ibrahim S. Shaik, Hyderabad (IN); Gollapudi Sai, Hyderabad (IN); Raviteja Pallaprolu, Hyderabad (IN); Reema Bangar, Hyderabad (IN); Muntha K. Rao, Hyderabad (IN); Vummidi Satyanarayana, Hyderabad (IN)

(73) Assignee: Nokia, Inc., Irving, TX (US)

( * ) Notice: Subject to any disclaimer, the term of this patent is extended or adjusted under 35 U.S.C. 154(b) by 1199 days.

(21) Appl. No.: 10/881,696

(22) Filed: Jun. 30, 2004

(65) Prior Publication Data

US 2006/0047803 A1    Mar. 2, 2006

(51) Int. Cl.
*G06F 15/173* (2006.01)
(52) U.S. Cl. .......................... 709/224; 709/223
(58) Field of Classification Search .......... 709/223–225, 709/220, 222
See application file for complete search history.

(56) References Cited

U.S. PATENT DOCUMENTS

| | | | |
|---|---|---|---|
| 5,819,028 A * | 10/1998 | Manghirmalani et al. ...... | 714/57 |
| 6,286,038 B1 * | 9/2001 | Reichmeyer et al. ......... | 709/220 |
| 6,324,577 B1 * | 11/2001 | Hirai .............................. | 709/223 |
| 6,353,854 B1 * | 3/2002 | Cromer et al. ................. | 709/224 |
| 6,490,617 B1 * | 12/2002 | Hemphill et al. .............. | 709/223 |
| 6,965,935 B2 * | 11/2005 | Diong ............................ | 709/224 |
| 7,577,723 B2 | 8/2009 | Matsuda et al. | |
| 2003/0140132 A1 | 7/2003 | Champagne et al. | |
| 2003/0161336 A1 | 8/2003 | Preguica et al. | |
| 2003/0229686 A1 | 12/2003 | Kortright | |
| 2004/0008727 A1 * | 1/2004 | See et al. ...................... | 370/469 |

FOREIGN PATENT DOCUMENTS

| | | |
|---|---|---|
| JP | 9-69083 A | 3/1997 |
| JP | 11-122283 | 4/1999 |
| JP | 2000-209231 A | 7/2000 |
| JP | 2004-30062 A | 1/2004 |
| JP | 2004072453 | 3/2004 |
| WO | WO-2004/025926 A1 | 3/2004 |

OTHER PUBLICATIONS

Oceanwave Consulting, Inc. "A DDNS Server Using Bind and Nsupdate." Nd. Available: http://www.oceanwave.com/technical-resources/unix-admin/nsupdate.html. 3pp.

(Continued)

*Primary Examiner* — Ario Etienne
*Assistant Examiner* — Hee Kim
(74) *Attorney, Agent, or Firm* — Alston & Bird LLP (57) ABSTRACT

Maintaining a current network address between a network device and a network management system (NMS) that enables central configuration control over a number of network devices. Network devices with dynamically changeable network addresses provide address updates to a listener system, which maintains a database of current IP addresses relative to device names. The network devices communicate with the listener system via a listener network address and a first predefined port. The NMS submits a device name to the listener system in a request for a current network address via a second predefined port. The listener system optionally checks a local hosts file and/or DNS server before resolving a current network address from the device name associated with a unique MAC address. The listener system provides the NMS with the current network address when requested by the NMS or immediately if the NMS registers for immediate notification of an address change.

13 Claims, 4 Drawing Sheets

OTHER PUBLICATIONS

DAG Wieers. Bind Dynamic DNS (DDNS) Updates Using Nsupdate. Nd. Available: http://dag.wieers.com/howto/bits/bind-ddns.php. 2pp.

Office Action mailed Jan. 12, 2010 in Japan Application No. 2007-518717.

Japanese Rejection mailed Oct. 12, 2010, in Japanese Application No. 2007-518717.

Oceanwave Consulting, Inc.; "A DDNS Server Using BIND and Nsupdate" [online]; [Retrieved on Jun. 1, 2004]; Retrieved from the Internet <URL: http://www.oceanwave.com/technical-resources/unix-admin/nsupdate.html; 3 pages.

DAG Wieers; "Bind Dynamic DNS (DDNS) Updates Using Nsupdate" [online]; [Retrieved on Jun. 1, 2004]; Retrieved from the Internet <URL: http://dag.wieers.com/howto/bits/bind-ddns.php; 2 pages.

\* cited by examiner

METHOD AND SYSTEM FOR DYNAMIC DEVICE ADDRESS MANAGEMENT

BACKGROUND OF THE INVENTION

A network management system (NMS) typically comprises a software program that enables a network administrator to centrally configure a number of network devices, such as routers, virtual private network (VPN) gateways, load balancers, firewalls, and the like, which are often used by enterprises. An NMS is usually run on a central computing device, but is often accessible from a remote computing device. The network administrator usually configures the NMS with a list of the network devices by entering a static Internet protocol (IP) address for each network device. Alternatively, the network administrator can enter a unique device name (sometimes referred to as a host name), and rely on a standardized domain name system (DNS) server to resolve the static IP address from the unique device name. Any change to a static IP address effectively comprises a change to a host name assignment, which is generally manually entered by a DNS service and propagated to relevant DNS servers.

Generally, NMS's do not enable any change to the static IP address or device name in the list of network devices, except by an authorized network administrator. However, some network devices can now use dynamically changing IP addresses, which can increase the security of each network device. Many Internet service providers (ISPs) dynamically assign an IP address to a client computing device that is valid only during one communication session. The ISP then reuses the same IP address for another client device when the communication session with the previous client computing device is ended. However, within an ISP and/or other enterprise, dynamic IP addresses were not historically needed for network devices such as routers, firewalls, and the like. As network usage grows, some large enterprises have increasingly larger numbers of such network devices, which might result in running out of static IP addresses for use by the enterprise. Large numbers of network devices can be managed easily by an NMS. However, modifying an NMS to allow automatic updates to the NMS list is expensive, and might introduce an access doorway that may affect the security of the entire enterprise network. A dynamic DNS server can resolve dynamic IP addresses, but generally requires manual configuration of multiple transaction signature (TSIG) keys and zone files that may not be practical for managing numerous network device with an NMS.

DETAILED DESCRIPTION OF THE INVENTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment or an embodiment combining software and hardware aspects. The following detailed description is, therefore, not to be taken in a limiting sense.

Throughout the specification, the term "connected" means a direct connection between the things that are connected, without any intermediary devices or components. The term "coupled," means a direct connection between the things that are connected, or an indirect connection through one or more either passive or active intermediary devices or components. The meaning of "a," "an," and "the" include plural references. The meaning of "in" includes "in" and "on."

Briefly stated, the invention is direct to a system and method for enabling an NMS to determine a current network address of one or more devices that can have dynamically changing network addresses.

Figure 1:
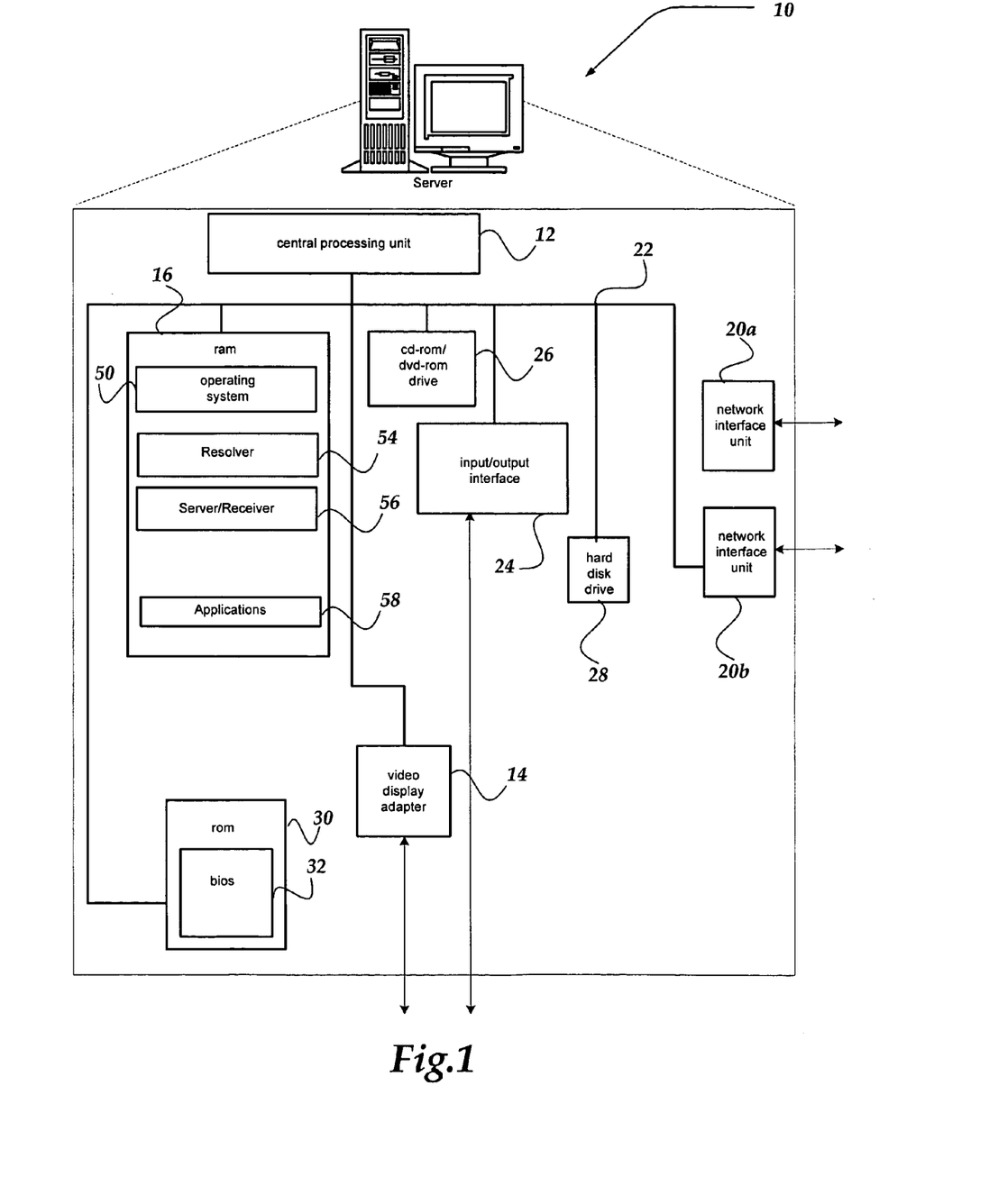
FIG. 1 shows a functional block diagram of an exemplary server according to one embodiment of the invention.

FIG. 1 shows a functional block diagram of an exemplary server 10, according to one embodiment of the invention. Client devices can be similarly configured. Server 10 may include many more components than those shown. The components shown, however, are sufficient to disclose an illustrative embodiment for practicing the invention.

Server 10 includes a processing unit 12, a video display adapter 14, and a mass memory, all in communication with each other via a bus 22. The mass memory generally includes RAM 16, ROM 30, and one or more permanent mass storage devices, such as an optical drive 26, a hard disk drive 28, a tape drive, and/or a floppy disk drive. The mass memory stores an operating system 50 for controlling the operation of server 10. Any general-purpose operating system may be employed. A basic input/output system ("BIOS") 32 is also provided for controlling low-level operation of server 10. Server 10 can communicate with the Internet or some other communications network via network interface units 20a and 20b, which are constructed for use with various communication protocols including transmission control protocol/Internet protocol (TCP/IP). Network interface units 20 and 20b are sometimes known as transceivers, transceiving devices, network interface cards (NICs), and the like. Server 10 also includes input/output interface 24 for communicating with external devices, such as a mouse, keyboard, scanner, or other input devices not shown in FIG. 1.

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by a computing device.

The mass memory also stores program code and data. One or more applications 58 are loaded into mass memory and run on operating system 50. Examples of application programs include database programs, schedulers, transcoders, email programs, calendars, web services, word processing programs, spreadsheet programs, and so forth. Mass storage may further include applications such as a resolver 54 for resolving client device addresses, a server/receiver 56 for communicating with client devices, and the like.

Figure 2:
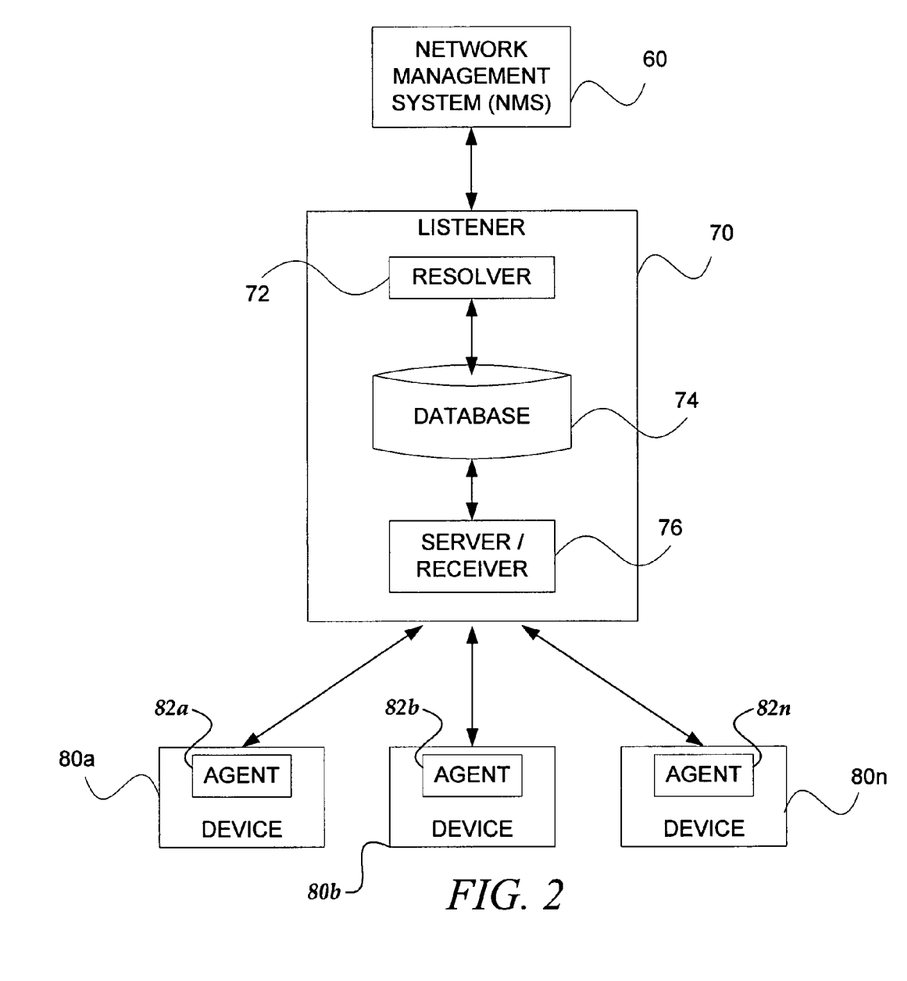
FIG. 2 is a functional block diagram illustrating an overall architecture of an exemplary embodiment of the present invention.

FIG. 2 is a functional block diagram illustrating an overall architecture of an exemplary embodiment of the present invention. An NMS 60 enables a network administrator to centrally maintain configuration control over any number of network devices 80a through 80n, so that the network administrator does not have to individually configure and/or reconfigure the network devices individually. NMS 60 can also enable the network administrator to monitor status of network devices, generate reports, and perform other network management operations. NMS 60 can comprise an application program, a server, and the like. NMS 60 provides a user interface for the network administrator to configuration and manage the network devices as long as NMS 60 knows the current IP address for any given network device.

If NMS 60 does not have a current IP address for a given network device, NMS 60 communicates with a listener 70, which maintains current IP addresses. Listener 70 NMS 60 can comprise an application program, a server, and the like. Listener 70 includes a resolver 72 that receives a request from NMS 60 and determines a current IP address for a given network device name. Resolver 72 can comprise a remote method invocation (RMI) server and the like. Correspondingly, NMS 60 can be implemented as an RMI client and the like. Resolver 72 communicates with a database 74 that stores device names, corresponding current IP addresses, corresponding MAC addresses, and other data.

Database 74 also communicates with a server/receiver 76 to store updated IP addresses and other data from network devices 80a through 80n. Server/receiver 76 can be implemented as a TCP server and the like. In any case, server/receiver 76 communicates with agents 82a through 82n running on each corresponding network device 80a through 80n. Agents 82a through 82n can comprise TCP agents and the like. The agents send updated IP addresses and other information to server/receiver 76, which stores the data in database 74 and can automatically notify NMS 60 of the updated data.

Figure 3:
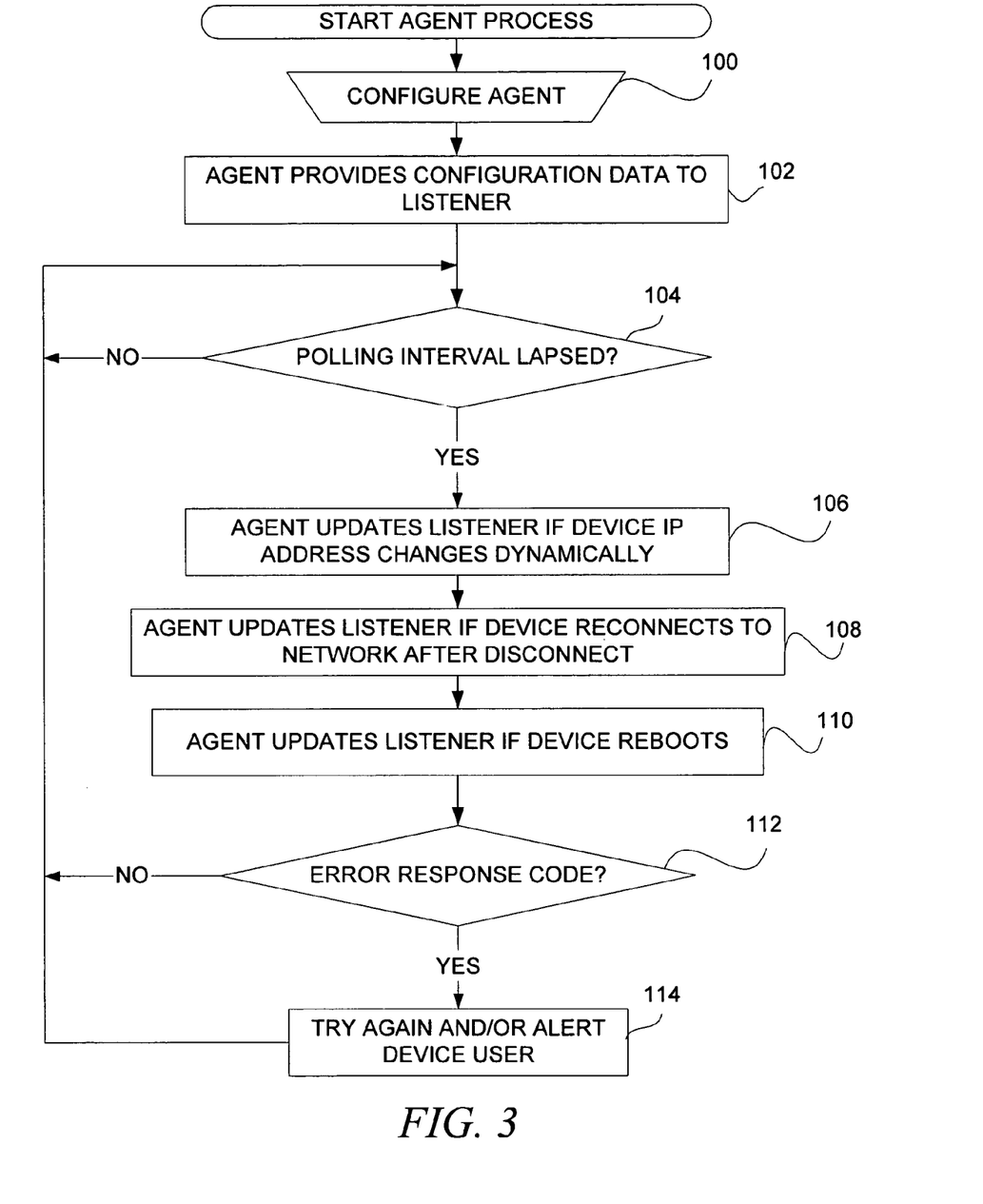
FIG. 3 is a flow diagram illustrating exemplary logic of an agent process running on a network device.

FIG. 3 is a flow diagram illustrating exemplary logic of an agent process running on a network device. At an operation 100, the network administrator or other user configures the agent for communication with the listener. For example, the user sets the network device to use dynamic IP addressing and enters a unique device name. The user also enters the listener's IP address and port number through which the network device can communicate with the listener. The user can also set a polling interval at which the network device will update the listener with the network device's current IP address and/or other information. Other configuration parameters can include security settings, log settings, and the like.

At an operation 102, the agent communicates its configuration information to the listener. For instance, the agent encrypts and sends a data packet comprising the network device's current IP address, device name, MAC address, time stamp, and/or other data. The agent can use any encryption algorithm, such as a triple data encryption standard (DES) algorithm with a shared key generated using the MAC address as input to a hashed message authentication code message digest 5 (HMACMD5) algorithm. The agent then waits for its preset polling interval to lapse at a decision operation 104. The agent then sends a data packet with an updated IP address to the listener at an operation 106, if the network device's IP address has changed dynamically. Alternatively, or in addition, the agent can send an update after an event, such as a reconnection to the network at an operation 108, a reboot at an operation 110, and/or other event.

At a decision operation 112, the agent checks a response code from the listener to see if the listener received a valid packet successfully. If the packet was invalid and/or an error occurred in the communication, the agent can try again, issue an alert, log the error, and/or take other recovery actions at an operation 114.

Figure 4:
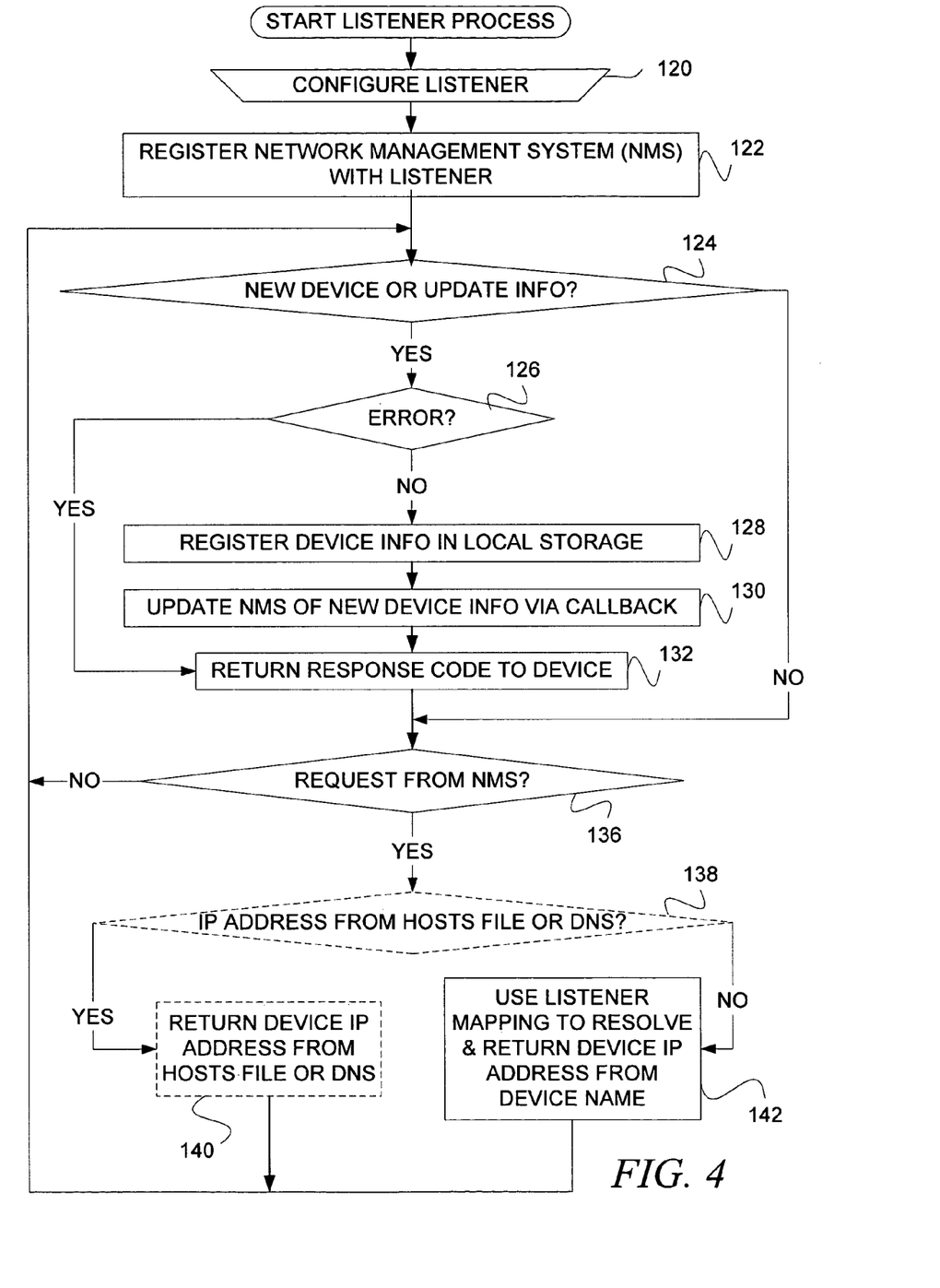
FIG. 4 is a flow diagram illustrating exemplary logic of the listener process.

FIG. 4 is a flow diagram illustrating exemplary logic of the listener process. At an operation 120, the network administrator or other authorized user configures the listener for communication with the network devices and the NMS. For example, the network administrator enters the listener's IP address at which the network devices and the NMS can contact the listener. The listener's IP address will generally remain a static IP address, but can be changed manually and/or dynamically. A change to the listener IP address can be sent to the NMS, which can be used to reconfigure the network devices as a batch. While configuring the listener, the network administrator defines an NMS port number through which the NMS will communicate with the listener. Similarly, the network administrator defines a device port number through which the network devices will communicate with the listener. The network administrator can also define a maximum number of device connections that the listener will support on a port and/or other configuration parameters. Other configuration parameters can include security settings, log settings, and the like.

At an operation 122, the listener initializes communication with the NMS via the NMS port number and can register the NMS for automatic callbacks to update the NMS whenever a network device changes IP address or other parameter. After configuration and initialization with the NMS, the listener is ready to receive messages from network devices and/or the NMS.

At a decision operation 124, the server/receiver of the listener detects an incoming data packet from an existing or new network device. The listener then determines, at a decision operation 126, whether the data packet is valid and/or whether the source is authentic. For example, the listener determines whether the received data packet was decrypted properly by the listener. If decryption is successful, the listener checks other aspects of the data. For instance, the listener determines whether the MAC address encoded in the packet header matches the MAC address in the body of the data packet. The listener also determines whether another network device is already registered by the listener with the same MAC address and/or the same device name. The listener might also be simply too busy to handle the received data packet at the current time, and/or some other unknown error may be detected. In any of these cases, an error response code would be returned to the network device that sent the data packet.

If no error is found with the data packet, the listener stores the packet information into the listener database at an operation 128. If the NMS is registered with the listener to receive immediate updates from the listener, the server/receiver of the listener notifies the NMS of the new network device information via a callback at an operation 130. If the update was successful, the listener returns a success response code to the network device at an operation 132. If errors were found, the above storage and callback operations are not performed, and instead an error code is returned to the network device at operation 132.

Updates received from the network devices are used to provide current information to the NMS, when the NMS requests current information from the listener. At a decision operation 136, the resolver of the listener detects a request from the NMS. The request from the NMS includes the device name of the network device for which the NMS desires current information. At an optional decision operation 138, the listener uses the device name to perform a conventional check of a local hosts file and/or a DNS server for the IP address of the desired network device. If a communication check between the listener and the network device succeeds with the IP address obtained through the conventional local hosts file and/or DNS server, the listener returns that IP address to the NMS at an optional operation 140.

However, if the communication check between the listener and the network device fails with the IP address obtained through the conventional local hosts file and/or DNS server, the resolver is called to resolve the current IP address based on the device name. The conventional checks can be omitted. Alternatively, the conventional checks can be bypassed with a flag that indicates that the network device uses a dynamically set IP address. When the conventional checks fail or are unused, the resolver generally performs a lookup in the listener database, at an operation 142, to determine the current IP address associated with the given device name. Alternative resolver schemes can be used based on the device name, MAC address, and/or other data associated with a network device. Once the listener sends the current IP address for the desired network device to the NMS, the listener returns to waiting for a new update from a network device or for a new request from the NMS.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method, comprising:
    associating a first network address with a device name of a device comprising a dynamically changeable network address;
    receiving from the device a message comprising a second network address;
    validating the message for at least one of a successful decryption of the message, a valid device name, or a match between a media access control address in a message header and in a message body;
    ensuring no duplicate association of the media access control address with another device;
    provided that the message is validated and there is no duplicate association of the media access control address with another device, replacing, by a processor, the first network address with the second network address such that the second network address is associated with the device name, wherein the first network address is replaced with the second network address dynamically without first informing a network management system;
    enabling the network management system to access the second network address based at least in part on the device name, wherein the network management system is configured to communicate with a plurality of devices via a network to enable a user to set communication parameters of the plurality of devices, wherein the network management system is configured to maintain configuration control over the plurality of devices so that the plurality of devices need not be configured individually, and wherein the device is configured to communicate with the network management system via a predefined port and the device comprises one of a firewall, a virtual private network gateway, a router, or a load balancer; and
    registering the network management system to automatically receive notice of the second network address being associated with the device.

2. The method of claim 1, wherein the network management system is accessible from a remote location.

3. The method of claim 1, wherein the device name is associated with a media access control address.

4. The method of claim 1, further comprising:
    receiving the second network address from the device; and
    automatically notifying the network management system of the second network address being associated with the device subsequent to the first network address being replaced with the second network address.

5. The method of claim 1, further comprising:
    receiving a request for the second network address from the network management system;
    attempting to determine the second network address with at least one of a hosts file and a domain name system; and
    resolving the second network address based at least in part on the device name when the second network address can not be determined with the at least one of the hosts file and the domain name system.

6. A computer program product comprising at least one non-transitory computer readable medium storing at least one computer program, the at least one computer program being configured to control a processor to perform:
    associating a first network address with a device name of a device comprising a dynamically changeable network address;
    receiving from the device a message comprising a second network address;
    validating the message for at least one of a successful decryption of the message, a valid device name, or a match between a media access control address in a message header and in a message body;
    ensuring no duplicate association of the media access control address with another device;
    provided that the message is validated and there is no duplicate association of the media access control address with another device, replacing the first network address with the second network address such that the second network address is associated with the device name, wherein the first network address is replaced with the second network address dynamically without first informing a network management system;
    enabling the network management system to access the second network address based at least in part on the device name, wherein the network management system is configured to communicate with a plurality of network devices to enable a user to set communication parameters of the plurality of network devices, wherein the network management system is configured to maintain configuration control over the plurality of devices so that the plurality of devices need not be configured individually, and wherein the device is configured to communicate with the network management system via a predefined port and the device comprises one of a firewall, a virtual private network gateway, a router, or a load balancer; and
    registering the network management system to automatically receive notice of the second network address being associated with the device.

7. An apparatus comprising:
    a processor;

a communication interface in communication with the processor, the communication interface configured to enable communication with a plurality of devices via a network; and a memory storing data and instructions configured to cause the processor to perform a plurality of operations comprising, associating a first network address with a device name of a device comprising a dynamically changeable network address, receiving from the device a message comprising a second network address, validating the message for at least one of a successful decryption of the message, a valid device name, or a match between a media access control address in a message header and in a message body, ensuring no duplicate association of the media access control address with another device;

provided that the message is validated and there is no duplicate association of the media access control address with another device, replacing the first network address with the second network address such that the second network address is associated with the device name, wherein the first network address is replaced with the second network address dynamically without first informing a network management system, enabling a network management system to access the second network address based at least in part on the device name, wherein the network management system is configured to communicate with the plurality of devices via the network to enable a user to set communication parameters of the plurality of devices, wherein the network management system is configured to maintain configuration control over the plurality of devices so that the plurality of devices need not be configured individually, and wherein the device is configured to communicate with the network management system via a predefined port and the device comprises one of a firewall, a virtual private network gateway, a router, or a load balancer, and registering the network management system to automatically receive notice of the second network address being associated with the device.

8. A method, comprising:

configuring a computing device to communicate with a listener system at a predefined network address associated with the listener system, wherein a device name associated with the computing device remains fixed and a network address associated with the computing device can change dynamically;

determining, by a processor, a change in network address of the computing device from a first network address to a second network address, wherein the change from the first network address to the second network address occurred dynamically without first informing a network management system; and causing the listener system to be provided with a message comprising the second network address via the predefined network address, wherein the second network address is used by the network management system to communicate with the computing device, wherein the listener system is configured to receive the message comprising the second network address; validate the message for at least one of a successful decryption of the message, a valid device name, or a match between a media access control address in a message header and in a message body; ensure no duplicate association of the media access control address with another device; and provided that the message is validated and there is no duplicate association of the media access control address with another device, replace the first network address with the second network address such that the second network address is associated with the device name dynamically without first informing the network management system; and wherein the network management system is configured to automatically receive notice of the second network address being associated with the computing device, wherein the network management system is configured to maintain configuration control over a plurality of computing devices so that the plurality of computing devices need not be configured individually, and wherein the computing device is configured to communicate with the network management system via a predefined port and the computing device comprises one of a firewall, a virtual private network gateway, a router, or a load balancer.

9. The method of claim 8, wherein the computing device is configured to communicate with the listener system via a transmission control protocol agent.

10. An apparatus, comprising at least one processor and at least one memory storing computer program code, wherein the at least one memory and stored computer program code are configured to, with the at least one processor, cause the apparatus to at least:

associate a first network address with a device name of a device comprising a dynamically changeable network address;

receive from the device a message comprising a second network address;

validate the message for at least one of a successful decryption of the message, a valid device name, or a match between a media access control address in a message header and in a message body;

ensure no duplicate association of the media access control address with another device;

provided that the message is validated and there is no duplicate association of the media access control address with another device, replace the first network address with the second network address such that the second network address is associated with the device name, wherein the at least one memory and stored computer program code are configured to, with the at least one processor, cause the apparatus to replace the first network address with the second network address dynamically without first informing a network management system;

enable the network management system to access the second network address based at least in part on the device name, wherein the network management system is configured to communicate with a plurality of devices via a network to enable a user to set communication parameters of the plurality of devices, wherein the network management system is configured to maintain configuration control over the plurality of devices so that the plurality of devices need not be configured individually, and wherein the device is configured to communicate with the network management system via a predefined port and the device comprises one of a firewall, a virtual private network gateway, a router, or a load balancer; and register the network management system to automatically receive notice of the second network address being associated with the device.

11. The apparatus of claim 10, wherein the device name is associated with a media access control address.

12. The apparatus of claim 10, wherein the at least one memory and stored computer program code are configured to, with the at least one processor, further cause the apparatus to:
receive a request for the second network address from the network management system,
attempt to determine the second network address with at least one of a hosts file and a domain name system, and
resolve the second network address based at least in part on the device name when the second network address can not be determined with the at least one of the hosts file and the domain name system.

13. An apparatus, comprising:
means for associating a first network address with a device name of a device comprising a dynamically changeable network address;
means for receiving from the device a message comprising a second network address;
means for validating the message for at least one of a successful decryption of the message, a valid device name, or a match between a media access control address in a message header and in a message body;
means for ensuring no duplicate association of the media access control address with another device;
means for, provided that the message is validated and there is no duplicate association of the media access control address with another device, replacing the first network address with the second network address such that the second network address is associated with the device name, wherein the means for replacing are configured for replacing the first network address with the second network address dynamically without first informing a network management system;
means for enabling the network management system to access the second network address based at least in part on the device name, wherein the network management system is configured to communicate with a plurality of devices via a network to enable a user to set communication parameters of the plurality of devices, wherein the network management system is configured to maintain configuration control over the plurality of devices so that the plurality of devices need not be configured individually, and wherein the device is configured to communicate with the network management system via a pre-defined port and the device comprises one of a firewall, a virtual private network gateway, a router, or a load balancer; and
means for registering the network management system to automatically receive notice of the second network address being associated with the device.

* * * * *